United States Patent
Chen et al.

(10) Patent No.: US 11,528,088 B2
(45) Date of Patent: Dec. 13, 2022

(54) ENHANCED LINK ADAPTATION

(71) Applicant: TELEFONAKTIEBOLAGET LM ERICSSON (PUBL), Stockholm (SE)

(72) Inventors: Xixian Chen, Ottawa (CA); Jun Wang, Nanjing (CN); James Jianfeng Weng, Kanata (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 34 days.

(21) Appl. No.: 16/964,466

(22) PCT Filed: Feb. 6, 2018

(86) PCT No.: PCT/IB2018/050735
§ 371 (c)(1),
(2) Date: Jul. 23, 2020

(87) PCT Pub. No.: WO2019/155249
PCT Pub. Date: Aug. 15, 2019

(65) Prior Publication Data
US 2021/0050935 A1    Feb. 18, 2021

(51) Int. Cl.
*H04L 1/00* (2006.01)
*H04W 52/12* (2009.01)

(52) U.S. Cl.
CPC .......... *H04L 1/0016* (2013.01); *H04L 1/0003* (2013.01); *H04L 1/0009* (2013.01); *H04L 1/0017* (2013.01); *H04W 52/12* (2013.01)

(58) Field of Classification Search
None
See application file for complete search history.

(56) References Cited

U.S. PATENT DOCUMENTS

| 2003/0081692 | A1* | 5/2003 | Kwan | H04L 1/0025 375/295 |
| 2011/0199985 | A1* | 8/2011 | Cai | H04L 27/0012 370/329 |
| 2011/0293031 | A1 | 12/2011 | Zhang et al. | |
| 2012/0276896 | A1* | 11/2012 | Ren | H04L 1/0018 455/423 |

(Continued)

OTHER PUBLICATIONS

Changsheng Yu et al: "Uplink Scheduling and Link Adaptation for Narrowband Internet of Things Systems". IEEE Access, vol. 5, Jan. 1, 2017 (Jan. 1, 2017). pp. 1724-1734, XP055467693, USA.

(Continued)

*Primary Examiner* — Mujtaba M Chaudry
(74) *Attorney, Agent, or Firm* — Ericsson Inc.

(57) ABSTRACT

Systems and methods for enhanced link adaptation are provided. In some embodiments, a method of operation of a network node includes calculating an actual RE efficiency based at least in part on an actual TBS obtained from a specification. The TBS may be obtained from a specification based on LA result and actual buffer data volume. The method also includes determining a real BLER from a searchable repository, based on the actual RE efficiency and an actual BLER. The method may further include calculating an actual outer-loop adjustment (OLA) step based on the actual BLER. The method may further include a dynamic outer-loop up/down step adjustment based on the actual OLA step.

12 Claims, 11 Drawing Sheets

(56) References Cited

U.S. PATENT DOCUMENTS

2015/0117321 A1     4/2015  Chen et al.
2017/0331577 A1*   11/2017  Parkvall .................. H04W 4/00

OTHER PUBLICATIONS

Plata Chaves, Jorge: International Search Report for PCT/IB2018/050735, European Patent Office, Rijswijk, The Netherlands, dated Oct. 18, 2018.

* cited by examiner

ENHANCED LINK ADAPTATION

CROSS REFERENCE TO RELATED APPLICATIONS

This application is a 35 U.S.C. § 371 national phase filing of International Application No. PCT/IB2018/050735, filed Feb. 6, 2018, the content of which is incorporated herein by reference in its entirety.

TECHNICAL FIELD

The present disclosure relates to wireless communication systems and, in particular, to link adaptation.

BACKGROUND

Link Adaptation (LA) is an important Radio Resource Management (RRM) function in wireless communication systems, such as LTE (Long Term Evolution) and 5G (Fifth Generation) NR (New Radio), for reliable communication. The purpose of link adaptation is to determine the appropriate modulation and coding scheme (MCS) to maximize user throughput. If MCS is too conservative, instantaneous channel capacity is not fully exploited. In contrast, if MCS is too aggressive, block error rate (BLER) increases and radio link efficiency is impaired. In an inner loop step of link adaptation, the appropriate MCS selection depends on the current channel quality signal-to-interference and noise ratio (SINR) indicated by CSI (channel system information) reported from user equipment (UE). Additional adjustment based on the HARQ feedback are done in an outer-loop step of link adaptation. For example, SINR is increased by an upward step when a HARQ ACK is received, which indicates successful transmission for a transport block (TB). On the other hand, SINR is decreased by a downward step when a HARQ NACK is received, which indicates failing transmission for a TB. The upward and downward adjustment steps are determined based a target BLER. For example, one downward step is set to nine upward steps with a target BLER of 10%. In other words, for a target BLER 10%, the upward step is set to the 1/9 of downward step. For example, if the upward step is 0.1 db, then the downward step is 0.9 db, which means when a ACK is received, SINR is only incremented by 0.1 db. However, once a NACK is received, the SINR will be dramatically dropped by 0.9 db.

Figure 1:
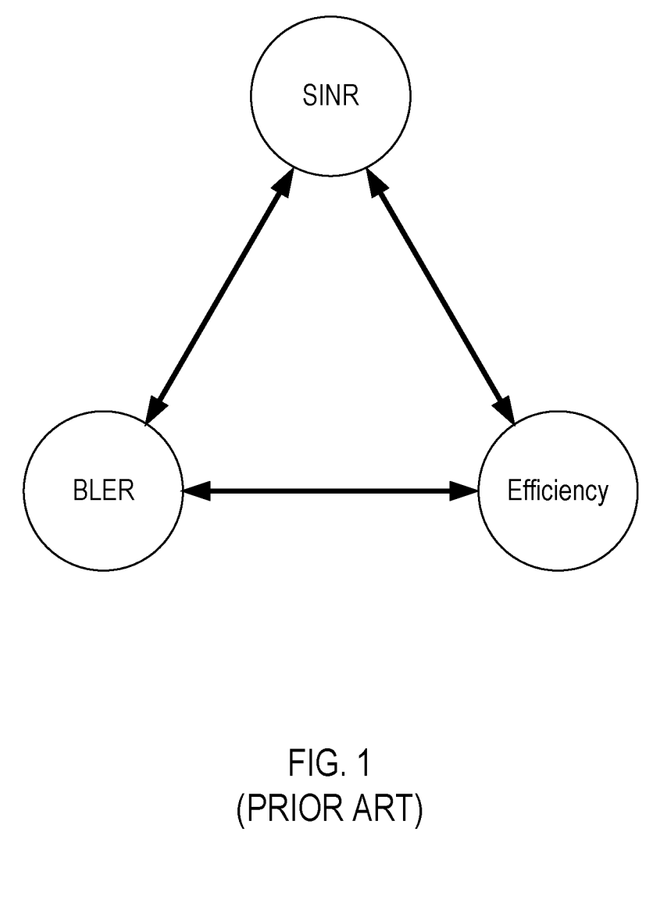
FIG. 1 illustrates three main related elements of a link adaptation process in a wireless communication system.

Typically, an LA procedure has three main related elements, illustrated in FIG. 1: SINR, BLER and RE efficiency. SINR is a physical parameter referring to the UE's channel quality, BLER is a configurable parameter referring to bearer's QoS requirements, and RE efficiency is the LA result referring the transmission performance and successful decoding probability. Once any two out of three elements are given, the remaining one is also derivable.

SUMMARY

Some embodiments advantageously provide a methods, base stations and wireless devices for link adaptation for dynamic BLER Targets. According to one aspect, a method of operation of a network node (12) in a wireless communication network is provided. The method comprises calculating an actual RE efficiency based at least in part on an actual TBS obtained from a specification and determining a real BLER from a searchable repository, based on the actual RE efficiency and an estimated SINR. In one embodiment, the method further comprises calculating an actual outer-loop adjustment (OLA) step based on the actual BLER. The TBS may be obtained from a specification based on LA result and actual buffer data volume. In another embodiment, the method further comprises a dynamic outer-loop up/down step adjustment based on the actual OLA step. In another embodiment, the actual BLER is calculated using the actual RE efficiency to look up the repository to find closest entry corresponding to the actual BLER. In another embodiment, the searchable repository is a 2-dimension RE efficiency vs SINR and BLER table, supporting a given BLER range. In another embodiment, the actual BLER is calculated using the actual RE efficiency to find closest table entry whose corresponding column indicates the actual BLER. In another embodiment, the method further comprises, the wireless communication network is a Long Term Evolution, LTE, wireless communication network. In another embodiment, the method further comprises, the wireless communication network is a New Radio, NR, or Fifth Generation, 5G, wireless communication network.

According to another aspect, a network node (12) within a wireless communication system is provided. The network node includes processing circuitry configured to calculate an actual RE efficiency based at least in part on an actual TBS obtained from a specification and determine a real BLER from a searchable repository, based on the actual RE efficiency and an estimated SINR. The TBS may be obtained from a specification based on LA result and actual buffer data volume. In one embodiment, the processing circuitry is further configured to calculate an actual outer-loop adjustment (OLA) step based on the actual BLER. In another embodiment, the processing circuitry is further configured to perform a dynamic outer-loop up/down step adjustment based on the actual OLA step. In another embodiment, the actual BLER is calculated using the actual RE efficiency to look up the repository to find closest entry to the actual BLER. In another embodiment, the searchable repository is a 2-dimension RE efficiency vs SINR and BLER table, supporting a given BLER range. In another embodiment, the actual BLER is calculated using the actual RE efficiency to find closest table entry whose corresponding column indicates the actual BLER.

According to another aspect, a network node within a wireless communication system is provided. The network node comprises an efficiency module operable to calculate an actual RE efficiency based at least in part on an actual TBS obtained from a specification and a BLER module (33) operable to determine a real BLER from a searchable repository, based on the actual RE efficiency and an estimated SINR. The TBS may be obtained from a specification based on LA result and actual buffer data volume.

According to another aspect, a network node adapted to operate according to the method of any of the embodiments disclosed herein is provided.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that although terminology from 3GPP LTE has been used in this disclosure, this should not be seen as limiting the scope of the disclosure to only the aforementioned system. Other wireless systems, including New Radio (NR) (i.e., Fifth Generation (5G)), Wideband Code-Division Multiple Access (WCDMA), Worldwide Interoperability for Microwave Access (WiMax), Ultra Mobile Broadband (UMB), and Global System for Mobile Communications (GSM), may also benefit from exploiting the ideas covered within this disclosure.

Also note that terminology such as evolved or enhanced NodeB (eNodeB) and User Equipment (UE) should be considered non-limiting and does not imply a certain hierarchical relation between the two; in general "eNodeB" could be considered as device 1 and "UE" device 2, and these two devices communicate with each other over some radio channel. Herein, wireless transmissions in the downlink are discussed in detail, but some embodiments of the disclosure are equally applicable in the uplink.

Figure 2:
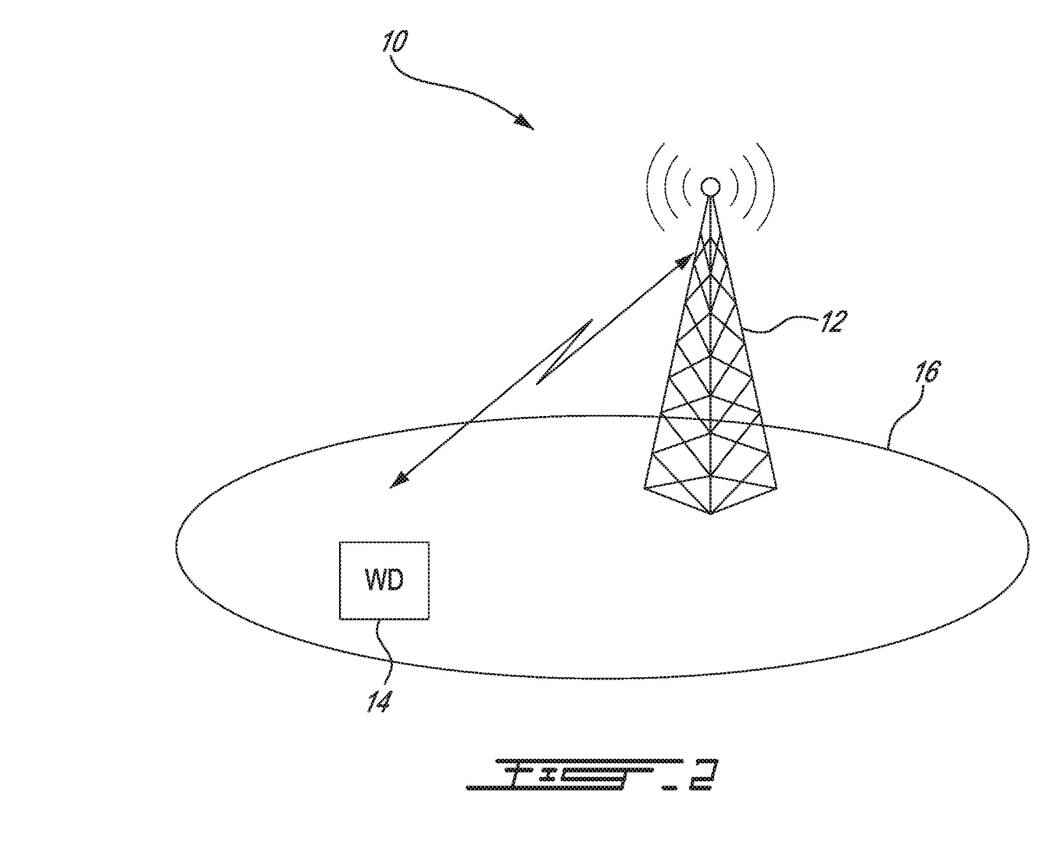
FIG. 2 illustrates one example of a wireless system 10 (e.g., a cellular communications system) in which embodiments of the present disclosure may be implemented.

In this regard, FIG. 2 illustrates one example of a wireless system 10 (e.g., a cellular communications system) in which embodiments of the present disclosure may be implemented. The wireless system 10 includes a first node 12, which in this example is a radio access node. However, the first node 12 is not limited to a radio access node and can be another device such as a general radio node allowing communication within a radio network, including a wireless device as described below. The radio access node 12 provides wireless access to other nodes such as wireless devices or other access nodes, such as a second node 14, within a coverage area 16 (e.g., cell) of the radio access node 12. In some embodiments, the second node 14 is a Long Term Evolution User Equipment (LTE UE) or 5G UE. Note that the term "UE" is used herein in its broad sense to mean any wireless device. As such, the terms "wireless device" and "UE" are used interchangeably herein.

In currently known LA procedures, the SINR and BLER are input parameters and the RE efficiency is an output result, i.e. (SINR, BLER)→RE efficiency.

The currently known LA solutions are designed for a fixed target BLER and may have some or all of the following problems:

First, the currently known LA solutions cannot handle the case where the actual BLER is different from target presumed one (e.g. 10%);

The currently known LA algorithms recommend the highest MCS based on a given BLER target such as 10%, i.e. (SINR, 10% BLER)→MCS. However, for various reasons (e.g. too many PRBs allocation in VoIP), the actual chosen MCS will be smaller than the recommended MCS to avoid padding bits. For example, when there is small amount of data in the user's buffer, e.g., in the case of VoIP or signaling, even only one resource block (one RBG=4PRBs) is allocated to the user equipment and the TB size derived from recommended MCS has already exceeded the data volume in the user buffer. In such a scenario, instead of inserting padding bits, the currently known solution lowers down the MCS (indicate a smaller TB size) aiming for better reliability, which results in the actual BLER less than the target BLER (10%). Such an intentionally reduced MCS is referred as conservative MCS. As mentioned above, the outer-loop adjustment step is determined by actual BLER. The adoption of conservative MCS means the legacy outer-loop adjustment step is no longer appropriate, since the legacy outer-loop adjustment step is calculated based on 10% BLER. However, the actual BLER may be different from the target, which means the legacy adjustment step can't match with the actual BLER.

Similarly, currently known LA solutions do not work either if the actual MCS is higher than the recommended MCS derived using the legacy formula (SINR, 10% BLER)→MCS. An intentionally increased MCS is referred as aggressive MCS. An aggressive MCS will inevitably boost the actual BLER higher than the target one (10%). An aggressive MCS can be seen if the channel condition is so bad that even the lowest recommended MCS cannot meet the BLER target or a TBS larger than the LA's TBS derived from the recommended MCS is selected to transmit all data in the buffer in one scheduling to reduce the end-to-end delay.

Second, the currently known LA algorithm cannot support multiple BLER targets simultaneously:

A UE may have multiple Radio Bearers with different BLER targets to meet different quality of services (QoS). For example, for broadband data radio bearer, the BLER for a first transmission is designed to be 10%. However, for signaling, VoIP, and critical communication radio bearers, the BLER targets for a first transmission are designed to be much lower than 10%. Obviously, a fixed target BLER cannot meet different QoS requirements for different radio bearers. For example, if the 10% BLER is selected for broadband data transmission, the performance of signaling, VoIP, and critical communication radio bearers will be degraded. If the lower BLER is selected to meet the QoS requirement for VoIP and critical communications, the throughput of broadband data service will suffer.

Even in the 5G, one Radio Bearer will have different BLER requirements at different time. For example, a radio bearer for video communication needs changing its BLER requirements according to its resolution granularity. The higher resolution can tolerate the higher BLER, and the lower resolution needs lower BLER.

Certain aspects of the present disclosure and their embodiments may provide solutions to these or other challenges.

As mentioned above, (SINR, BLER)→Efficiency procedure is adopted in currently known LA algorithms. However, to resolve some of the known problems, other procedures are needed. For example, when the data amount in the buffer is far below the TB size (TBS) recommended by LA (e.g., VoLTE or signaling), decrease of TB size (i.e. MCS reduction—Note: According to the formula: TBS=RE efficiency*RE number, in which RE efficiency is one-to-one mapped from MCS. So decrease of TBS is actually equivalent to decrease of MCS, also referred to as MCS reduction. Herein, the two terms refer to the same procedure) seems better than inserting a lot of padding bits. In this case, the real BLER is much different from the presumed one (10%) so that the outer-loop adjustment step will be impacted. Then, according to some embodiments of the present disclosure, a different procedure, (SINR, Efficiency)→BLER is introduced, in which the SINR and Efficiency at this time become the known input parameters and the real BLER is the unknown result derived based on the inputs.

For upcoming systems, a procedure, (BLER, Efficiency)→SINR, may also be needed, e.g. for when 5G supports power control at base station, e.g. given BLER target and actual efficiency as inputs, the power needed boost/decrease to achieve the BLER is calculated.

According to some disclosed embodiments, methods, apparatuses, and systems for an enhanced link adaption are proposed to incorporate some or all above procedures. According to some embodiments, supporting dynamic BLER targets, contains two procedures: design time and runtime time.

In a design time procedure, a 2-dimension table is generated. Unlike currently known LA algorithm which have only one SINR-Efficiency relationship curve corresponding to a fixed BLER (10%), in some embodiments of the present disclosure multiple SINR-efficiency curves corresponding to different BLERs (such as from 0.1%-40%) are prepared (generated) respectively, e.g. through offline simulation or field test results. According to some embodiments, such multiple SINR-efficiency curves are arranged into a 2-dimensional table for runtime usage. In such a 2-dimensional table, the row may stand for SINR and the column may represents the target BLER. However, it will be understood by those skilled in the art that any searchable repository providing a way of organizing the multiple SINR-efficiency curves (or data points corresponding to such curves) versus different BLER targets can be used.

Figure 3:
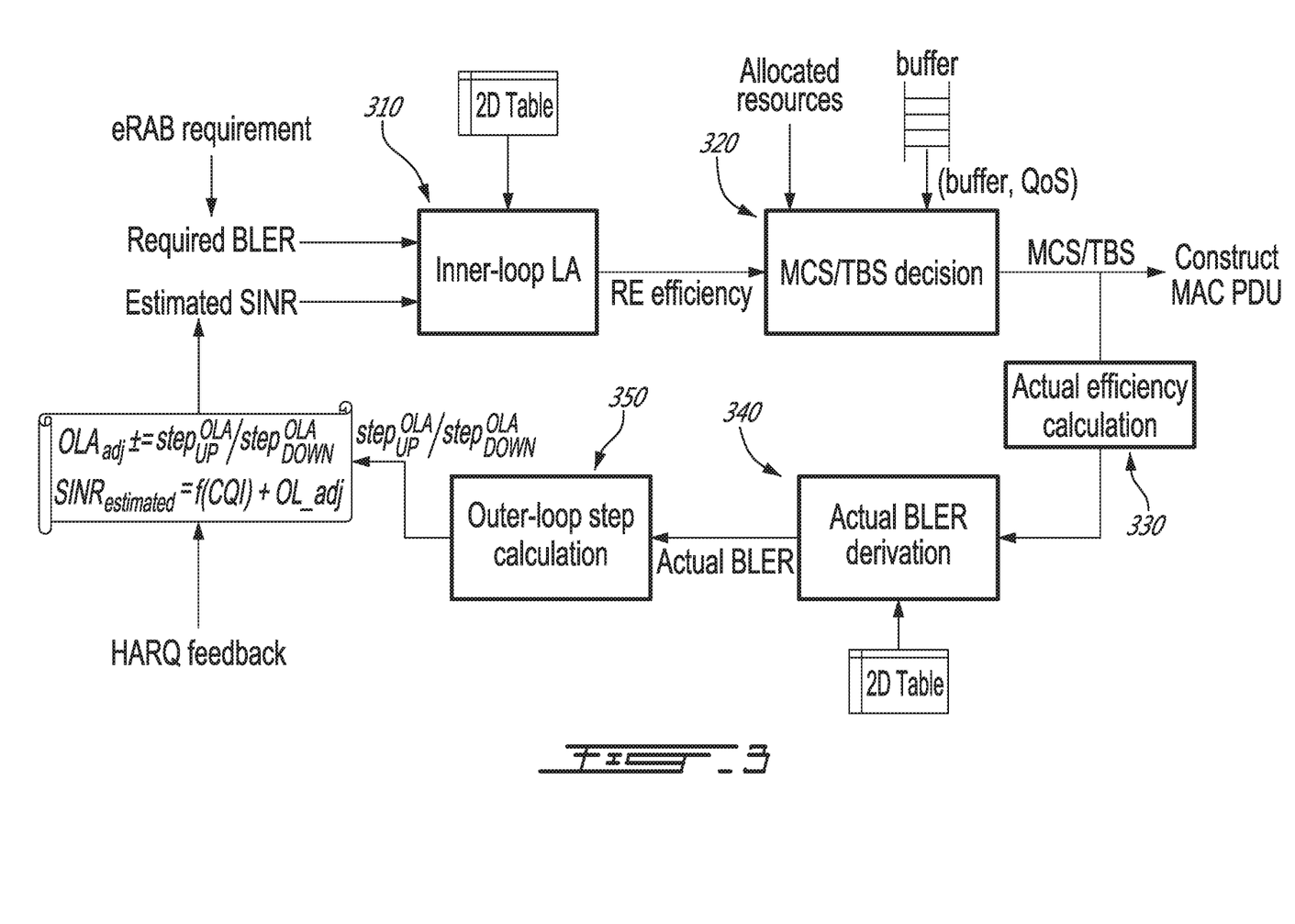
FIG. 3 illustrates a data flow for runtime link adaption based on a 2-dimensional table, according to an exemplary embodiment of the present disclosure.

FIG. 3 illustrates a data flow for runtime link adaption based on a 2-dimensional table as described above, according to an exemplary embodiment of the present disclosure. At step 310, and an inner-loop LA is performed: during scheduling, the base station uses the estimated SINR and required BLER to look up the 2-dimension table to fetch the supported efficiency, i.e. information-bits per RE vs. SINR (see Table 1), i.e. RE efficiency. Next, at step 320, the highest MCS and TBS are determined (decided), according to the allocated resource blocks using the formula (1), to maximize the user's date throughput. If the SINR for each PRB is assumed to be the same, $TBS_{ILA}$, the TBS value corresponding to the highest throughput can be calculated from $$TBS_{ILA} = Efficiency_{ILA} \times N_{RE} \times N_{layer} \quad (1)$$

where $N_{RE}$ is the total number of assigned REs, and $N_{layer}$ is the total number of layers.

This calculation just gives the recommended MCS and TBS based on SINR and BLER target instead of actual TBS (or real TBS or $TBS_{real}$). The actual TBS accounts for other factors, such as the data volume in buffer or other scheduling strategy (e.g., QoS). Based on these factors, the real TBS is decided and it may be less or larger than $TBS_{ILA}$. Accordingly, the corresponding MCS can be conservative or aggressive.

At step 330, the actual RE efficiency, RE actual efficiency, is calculated using the following formula (2):

$$RE \text{ actual efficiency} = \frac{TBS_{real}}{N_{RE} \times N_{layer}} \quad (2)$$

At step 340, the real BLER (or actual BLER) is determined based on the actual efficiency. The actual RE efficiency is used to search horizontally in a row corresponding to the current SINR from a 2-dimensional table in which the columns represents different BLER targets and the rows represents different SINR values (see Table 2). The column corresponding to the RE efficiency with the closest value to the actual RE efficiency indicates the actual BLER corresponding to the determined MCS and TBS.

At step 350, an outer-loop step calculation is performed. The step of inner-loop LA needs the estimated SINR to look up the 2-dimension table. The estimated SINR used for MCS and TBS selection is calculated using the following formula:

$$SINR_{estimated} = f(CQI) + OL\_adj, \quad (3)$$

where the f(CQI) is a mapping from a CQI (Channel Quality Indicator) report to a specific SINR value. From (3), it can be seen that the estimated SINR actually includes two parts: the relatively fixed part, f(CQI), derived from the CQI report and varied outer-loop adjustment, OL_adj, which is used to compensate the difference between UE reported CQI and actual channel quality.

The outer-loop adjustment algorithm is as follows:

Initialization: OL_adj = 0
if a TB transmission is successful (ACK)
    OL_adj += $step_{UP}^{OLA}$
else if a TB transmission is failed
    OL_adj -= $step_{DOWN}^{OLA}$
end if The $step_{UP}^{OLA}$ and OL_adj-=$step_{DOWN}^{OLA}$ just reflect the SINR adjustment direction and speed in a heuristic way, i.e., successful transmission increases SINR smoothly and failing transmission decreases SINR rapidly, which is actually decided by the actual BLER target derived in step 340, according to the following formula:

$$step_{UP}^{OLA} = \frac{step_{DOWN}^{OLA}}{\frac{1}{BLER} - 1} \quad (4)$$

where $step_{DOWN}^{OLA}$ is a configurable parameter.

One or more of the following technical advantages may be provided by certain embodiments of the present disclosure.

First, different BLER targets may be supported. In addition, there may be a change of a BLER target in a uniform way. More specifically, in the embodiments presented above, a 2-dimension table takes SINR and BLER as inputs. Therefore, MCS selection under multiple BLER targets is supported. In other words, the BLER target can be dynamically set during each TTI (transmission time interval) scheduling and it can also be freely changed in another TTI. This not only allows multiple BLER targets for different radio bearers, but also supports time-varying BLER target for a bearer. Since the LA algorithm disclosed above doesn't depend on any predefined BLER (for example 10%), it handles dynamic BLER in a uniform way instead of on a case by case basis. This LA algorithm is also referred herein as a dynamic BLER based LA algorithm.

Another possible advantage is that a more accurate outer-loop adjustment (OLA), based on the actual BLER may be achieved. Considering there exist some factors (e.g. UE hardware implementation, time-varying channel, quantization error, random interference etc.) causing a deviation between the UE reported CQI and the actual channel quality, the OLA becomes one method to compensate this deviation. Since the OLA up/down step is related to the actual transmission BLER, the dynamic BLER based LA algorithm disclosed herein comprises a step to recalculate the actual BLER based on the actual RE efficiency so that the OLA step can be adjusted to accurately match the actual BLER, thus guaranteeing outer-loop convergence.

Figure 4:
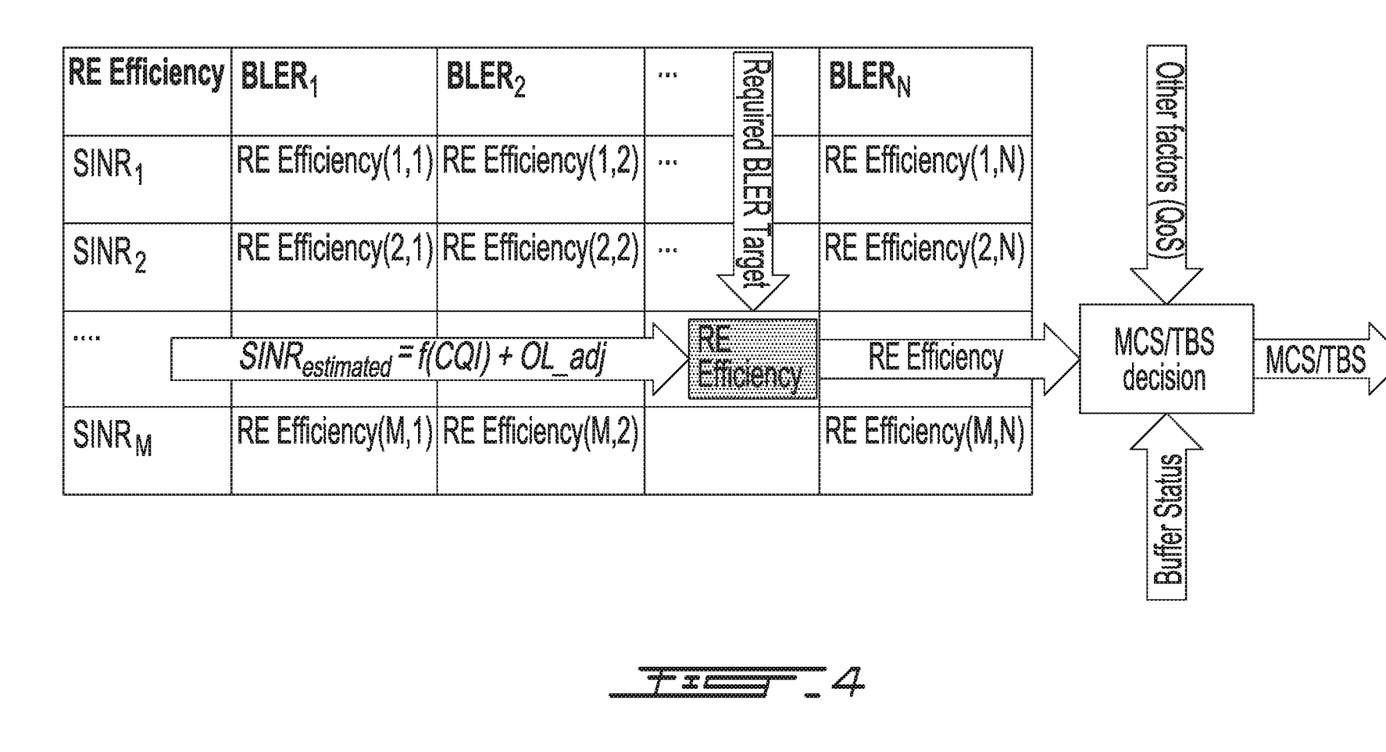
FIG. 4 illustrates steps for MCS and TBS Selection Based on different BLER Targets, according to some embodiments of the disclosure.
Figure 5:
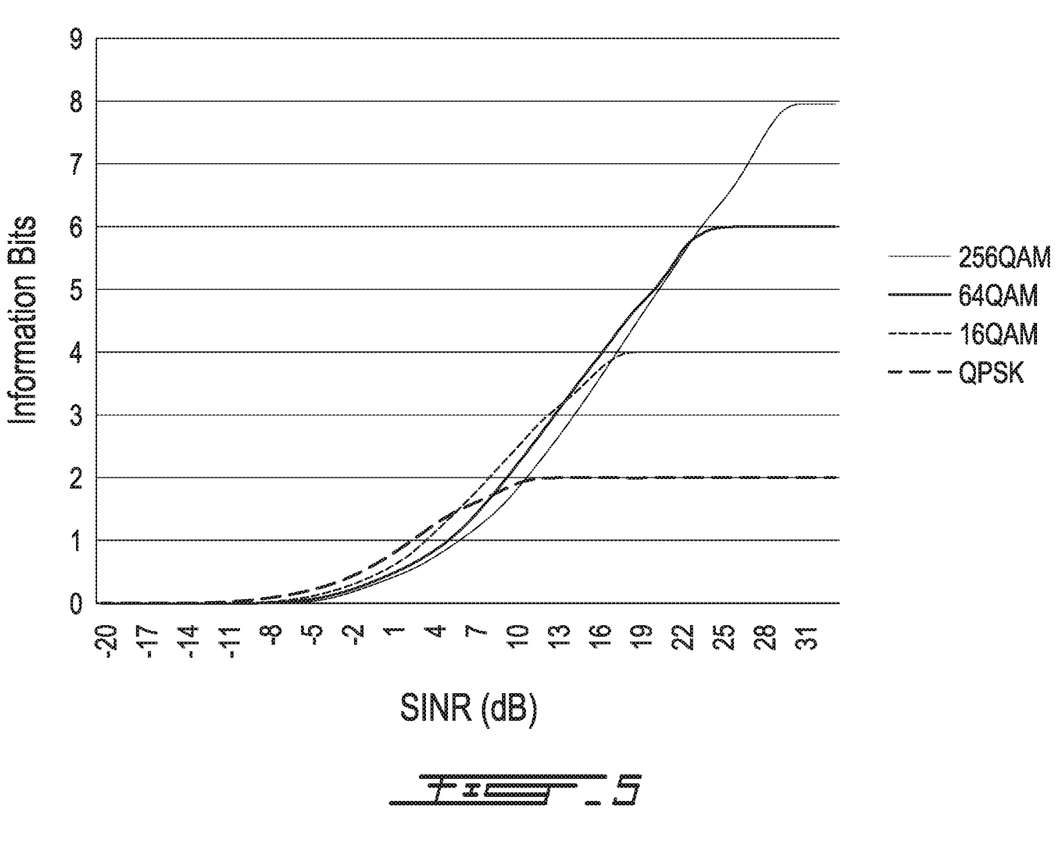
FIG. 5 illustrates the RE efficiency vs. SINR relationship curves for QPSK, 16QAM, 64QAM and 256QAM at 10% BLER.

FIG. 4 illustrates steps for MCS and TBS Selection Based on different BLER Targets, according to some embodiments of the disclosure. FIG. 5 illustrates the RE efficiency vs. SINR relationship curves for QPSK, 16QAM, 64QAM and 256QAM at 10% BLER. An SINR to information bits mapping table (see Table 1) can be created based on the envelope curve in FIG. 5. Note that each element in the last column of Table 1 is called RE efficiency which is the maximum information bits per RE among all the modulations for a given SINR value. To deal with multiple BLER targets, multiple similar SINR to information bits mapping tables can be created with each of them corresponds to different BLER target. Finally, a 2-dimension table (Table 2) is generated by combining all the mapping tables together, in which the row stands for the SINR levels and column represents different BLER targets.

Referring back to FIG. 4, the following is a description of the MCS and TBS Selection Based on Different BLER Targets, according to some embodiments: Taking the estimated SINR and target BLER requirement of a radio bearer as row and column inputs, a base station can look up the 2-dimension table to decide the supported RE efficiency and do MCS and TBS selection accordingly. For example, if the target BLER of VoIP radio bearer is 8%, we can use the SINR and the column corresponding to 8% BLER to do the MCS and TBS selection. An assumption is that all the layers in a codeword have the same modulation. For each RE of the allocated resources, its information bits per layer based on its SINR and the target BLER can be calculated. For example, target BLER=10%, and SINR=10 dB, the information bits of the RE per layer is 2.5 bits. If it has L layers, the information bits that this RE can carry is 2.5*L bits. Then the accumulated information bits (AIB) are calculated by summing up all the information bits of the allocated RE resources, which indicates the total number of bits that can be carried by the allocated resources, which forms the estimated TB size. The estimated TB size is then quantized to the nearest eligible TBS value by searching the TBS Table defined in the standards (for example 3GPP TS 36.213, E-UTRA Physical layer procedures, v0.9.0). If the estimated TBS is larger than the amount of data in the user buffer, padding bits can be applied or the MCS can be reduced to the specific value whose corresponding TBS is the smallest valid TBS value which is larger or equal to the amount of data in the user buffer. If the estimated TBS value is slightly smaller than the amount of data in the user buffer, the base station can also increase the MCS a little to empty the buffer at current TTI to shorten the data transmission delay, which is important for example for QoS service.

TABLE 1

Information Bits Per RE for QPSK, 16QAM, 64QAM, 256QAM vs. SINR by assuming 10% BLER.

| SINR | QPSK | 16QAM | 64QAM | 256QAM | ReEfficieny |
|---|---|---|---|---|---|
| −20 | 0.0000 | 0.0000 | 0.0000 | 0.0000 | 0.0000 |
| −19 | 0.0000 | 0.0000 | 0.0000 | 0.0000 | 0.0000 |
| −18 | 0.0000 | 0.0000 | 0.0000 | 0.0000 | 0.0000 |
| −17 | 0.0000 | 0.0000 | 0.0000 | 0.0000 | 0.0000 |
| −16 | 0.0000 | 0.0000 | 0.0000 | 0.0000 | 0.0000 |
| −15 | 0.0054 | 0.0000 | 0.0000 | 0.0000 | 0.0054 |
| −14 | 0.0122 | 0.0000 | 0.0000 | 0.0000 | 0.0122 |
| −13 | 0.0210 | 0.0000 | 0.0000 | 0.0000 | 0.0210 |
| −12 | 0.0317 | 0.0000 | 0.0000 | 0.0000 | 0.0317 |
| −11 | 0.0454 | 0.0044 | 0.0000 | 0.0000 | 0.0454 |
| −10 | 0.0620 | 0.0171 | 0.0000 | 0.0000 | 0.0620 |
| −9 | 0.0825 | 0.0332 | 0.0039 | 0.0000 | 0.0825 |
| −8 | 0.1079 | 0.0537 | 0.0225 | 0.0000 | 0.1079 |
| −7 | 0.1387 | 0.0786 | 0.0454 | 0.0195 | 0.1387 |
| −6 | 0.1758 | 0.1099 | 0.0737 | 0.0464 | 0.1758 |
| −5 | 0.2222 | 0.1479 | 0.1069 | 0.0781 | 0.2222 |
| −4 | 0.2803 | 0.1943 | 0.1479 | 0.1167 | 0.2803 |
| −3 | 0.3501 | 0.2500 | 0.1973 | 0.1631 | 0.3501 |
| −2 | 0.4434 | 0.3159 | 0.2544 | 0.2168 | 0.4434 |
| −1 | 0.5571 | 0.3950 | 0.3213 | 0.2783 | 0.5571 |
| 0 | 0.6797 | 0.4937 | 0.3994 | 0.3501 | 0.6797 |
| 1 | 0.8145 | 0.6064 | 0.4883 | 0.4316 | 0.8145 |
| 2 | 0.9575 | 0.7500 | 0.5894 | 0.5244 | 0.9575 |
| 3 | 1.1079 | 0.9307 | 0.7139 | 0.6294 | 1.1079 |
| 4 | 1.2471 | 1.1313 | 0.8540 | 0.7461 | 1.2471 |
| 5 | 1.3833 | 1.3428 | 1.0088 | 0.8823 | 1.3833 |
| 6 | 1.5166 | 1.5596 | 1.2051 | 1.0352 | 1.5596 |
| 7 | 1.6035 | 1.7905 | 1.4438 | 1.1982 | 1.7905 |
| 8 | 1.6987 | 2.0112 | 1.6958 | 1.3823 | 2.0112 |
| 9 | 1.8325 | 2.2700 | 1.9580 | 1.5942 | 2.2700 |
| 10 | 1.9346 | 2.4863 | 2.2163 | 1.8486 | 2.4863 |
| 11 | 1.9780 | 2.7231 | 2.5044 | 2.0942 | 2.7231 |
| 12 | 1.9897 | 2.9673 | 2.7939 | 2.3999 | 2.9673 |
| 13 | 1.9922 | 3.1338 | 3.0688 | 2.6670 | 3.1338 |
| 14 | 1.9922 | 3.3232 | 3.3892 | 2.9487 | 3.3892 |
| 15 | 1.9922 | 3.5225 | 3.6558 | 3.2646 | 3.6558 |
| 16 | 1.9922 | 3.7471 | 3.9585 | 3.5869 | 3.9585 |
| 17 | 1.9922 | 3.9116 | 4.2266 | 3.9028 | 4.2266 |
| 18 | 1.9922 | 3.9697 | 4.5371 | 4.2388 | 4.5371 |
| 19 | 1.9922 | 3.9834 | 4.7471 | 4.5928 | 4.7471 |
| 20 | 1.9922 | 3.9849 | 5.0068 | 4.8804 | 5.0068 |
| 21 | 1.9922 | 3.9849 | 5.2827 | 5.2119 | 5.2827 |
| 22 | 1.9922 | 3.9849 | 5.5928 | 5.5166 | 5.5928 |
| 23 | 1.9922 | 3.9849 | 5.8389 | 5.8940 | 5.8940 |
| 24 | 1.9922 | 3.9849 | 5.9375 | 6.1567 | 6.1567 |
| 25 | 1.9922 | 3.9849 | 5.9712 | 6.4116 | 6.4116 |
| 26 | 1.9922 | 3.9849 | 5.9775 | 6.7310 | 6.7310 |
| 27 | 1.9922 | 3.9849 | 5.9775 | 7.1060 | 7.1060 |
| 28 | 1.9922 | 3.9849 | 5.9775 | 7.4868 | 7.4868 |
| 29 | 1.9922 | 3.9849 | 5.9775 | 7.7925 | 7.7925 |
| 30 | 1.9922 | 3.9849 | 5.9775 | 7.9229 | 7.9229 |
| 31 | 1.9922 | 3.9849 | 5.9775 | 7.9663 | 7.9663 |
| 32 | 1.9922 | 3.9849 | 5.9775 | 7.9702 | 7.9702 |
| 33 | 1.9922 | 3.9849 | 5.9775 | 7.9702 | 7.9702 |

Figure 6:
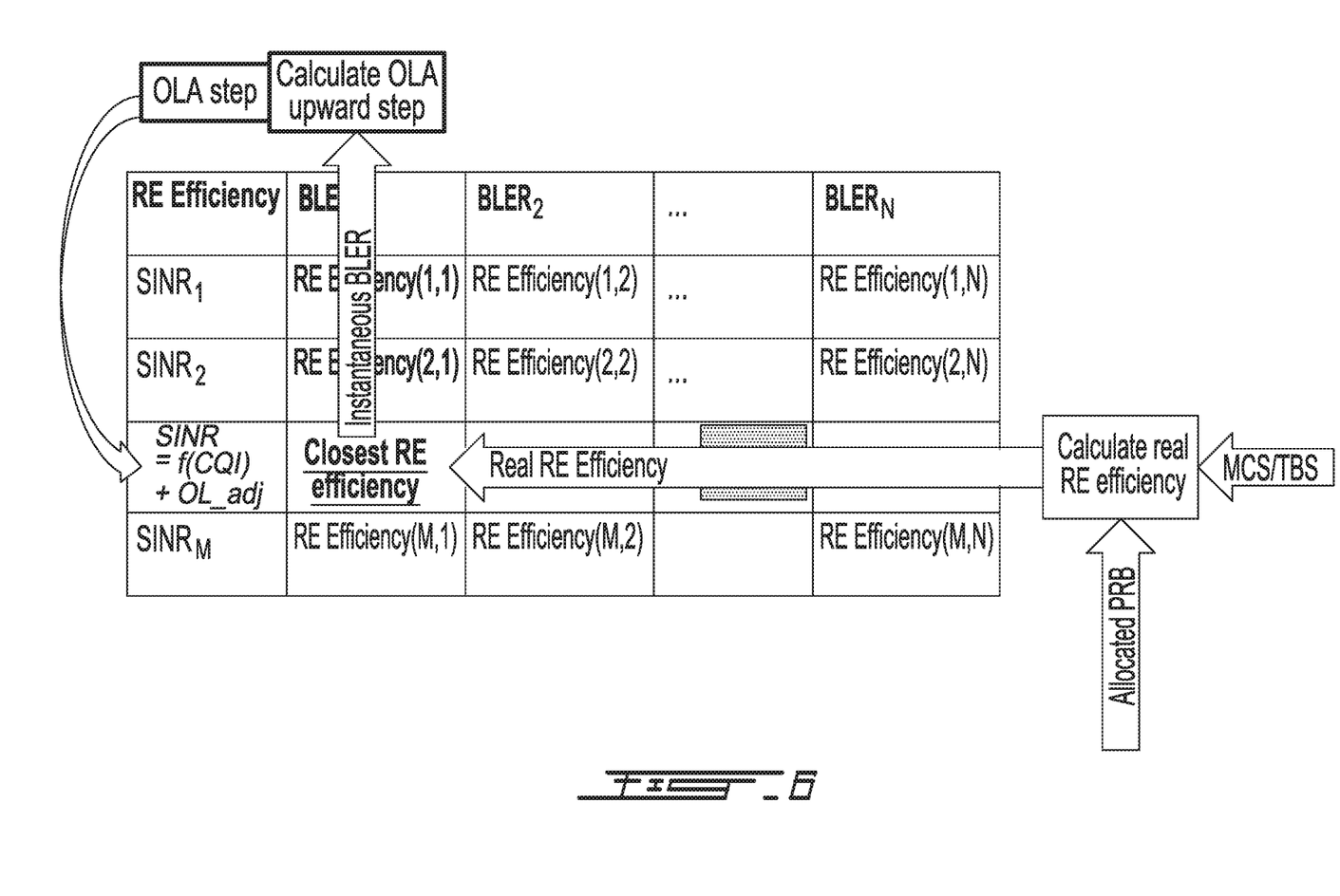
FIG. 6 illustrates the process of estimating the BLER for the selected MCS and TBS, according to some embodiments of the disclosure.
Figure 7:
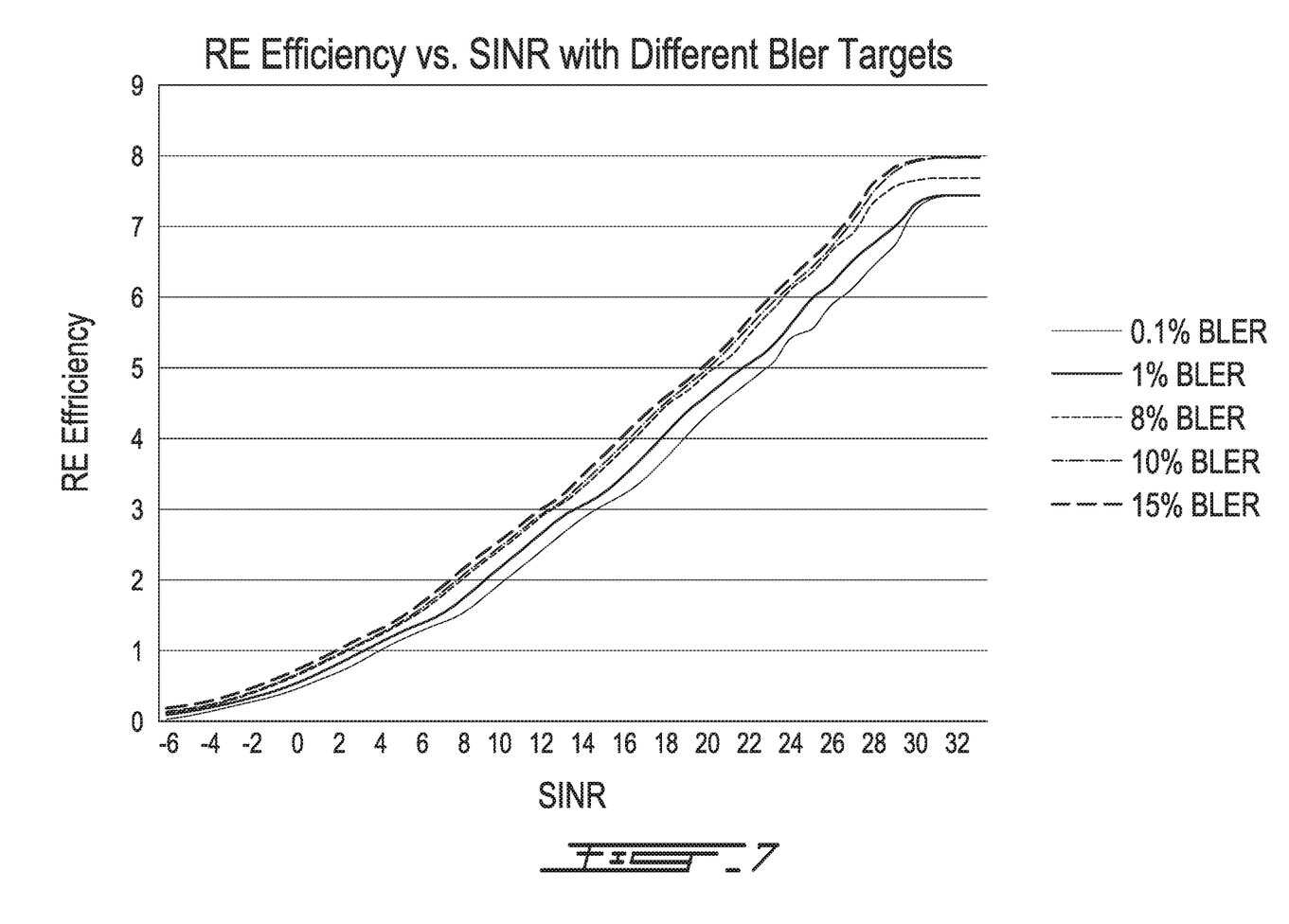
FIG. 7 is the combination of the envelope curves extracted from FIG. 5, corresponding to different BLER targets.

FIG. 6 illustrates the process of estimating the BLER for the selected MCS and TBS, according to some embodiments of the disclosure. FIG. 7 is the combination of the envelope curves extracted from FIG. 5, corresponding to different BLER targets. It shows the relationship of RE efficiency vs. SINR with different BLER targets, from which it can be seen that for a given SINR, RE efficiency is increased with the increase of BLER target. Based on FIG. 7, a RE efficiency vs. SINR table with different BLER targets can be created (see Table 2). Its horizontal index (Column) represents different BLER target and its vertical index (Row) represents different SINR, the intersectional cell just holds the corresponding RE efficiency at given SINR and BLER. Tables 1 and 2 can be generated offline through either computer simulation and field test results.

Based on the estimated channel quality (SINR) and BLER target, the accumulated information bits (AIB) can be calculated by summing up the information bits of all the assigned REs, based on which the average RE efficiency (the average information bits per RE per layer can carry) can be calculated by dividing AIB by total number of the assigned REs times total number of layers. It is then used to search vertically through the column corresponding to the BLER target in Table 2 and find its closest RE efficiency value whose row refers to the UE's averaged SINR for the current TTI and will be used for subsequent real BLER calculation.

Taking into consideration some other factors, such as buffer status and bearer QoS requirements, the actual information bits (TB size) is finally decided, based on which the real RE efficiency can be calculated by dividing the TB size by total number of the assigned REs times total number of layers. The real RE efficiency is then used to search horizontally in a row corresponding to the above averaged SINR (see Table 2) to find the closest RE efficiency value whose column just corresponds the real BLER for the selected MCS and TBS.

TABLE 2

RE Efficiency vs. SINR with Different BLER Targets

| SINR (dB) | BLER$_1$ | BLER$_2$ | ... | BLER$_N$ |
|---|---|---|---|---|
| SINR$_1$ | RE Efficiency(1, 1) | RE Efficiency(1, 2) | ... | RE Efficiency(1, N) |
| SINR$_2$ | RE Efficiency(2, 1) | RE Efficiency(2, 2) | ... | RE Efficiency(2, N) |
| ... | ... | ... | ... | ... |
| SINR$_M$ | RE Efficiency(M, 1) | RE Efficiency(M, 2) | ... | RE Efficiency(M, N) |

After the BLER is estimated, the outer-loop adjustment based on the estimated BLER can be performed as described above, in connection with FIG. 3.

Embodiments of the LA algorithm described herein may provide an link adaptation method which does not rely on any predefined BLER target. Moreover, this link adaptation method according to some embodiments of the disclosure is not only decoupled from the MCS/TBS decision procedure but also dynamically calculates the instantaneous BLER according to the real RE efficiency. This allows for a uniform LA algorithm with some of the following that may provide some of the following aspects:

Unlike currently known 1-dimension RE efficiency vs SINR table (e.g. for a 10% BLER), in embodiments of the present disclosure a 2-dimension RE efficiency vs SINR and BLER table (or other equivalent searchable repository) supporting a wide BLER range (from 0.1%-40%) is generated offline optionally based on the simulation or real field data, for use in runtime LA execution. According to some embodiments, the runtime LA execution includes a step of recommended MCS selection and a step of estimation of actual BLER.

Compared with currently known LA algorithm that only support a fixed BLER target (e.g. 10%), some embodiments of the present disclosure support MSC selection under multiple BLER targets by searching a 2-dimension table (or other searchable repository) using different BLER targets, e.g. as column input.

In some embodiments of the present disclosure, a step following MCS selection step is to recalculate the instantaneous BLER based on the actual RE efficiency through horizontal search of 2-dimension table row.

In some embodiments of the present disclosure, dynamic outer-loop up/down step adjustment is based on the instantaneous BLER.

Figure 8:
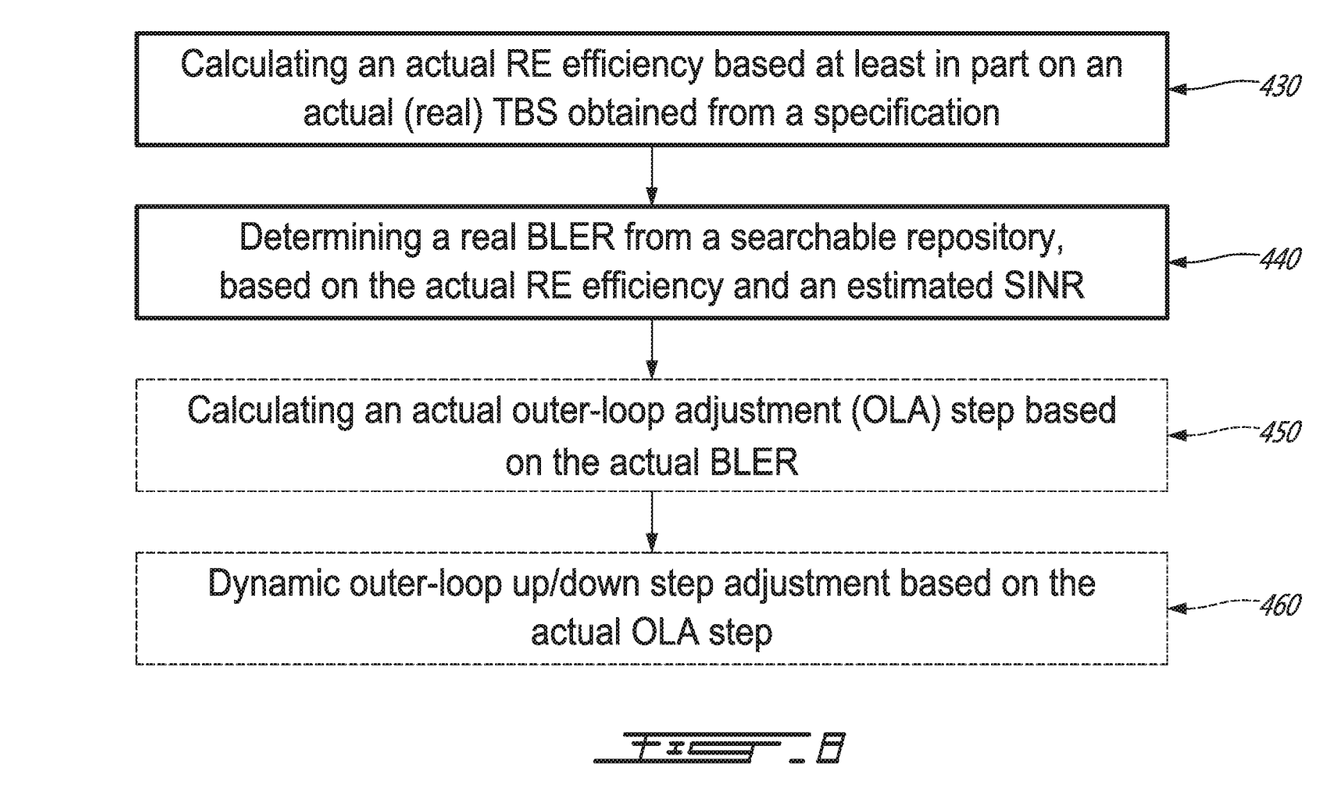
FIG. 8 illustrates a flow chart of a method of link adaptation at a network node, in accordance with some embodiments of the present disclosure.

FIG. 8 illustrates a flow chart of a method of link adaptation at a network node (12), in accordance with some embodiments of the present disclosure. The method comprises calculating an actual RE efficiency based at least in part on an actual (real) TBS obtained from a specification (step 430). The TBS may be obtained from a specification based on LA result and actual buffer data volume. The method also comprises determining a real BLER from a searchable repository, based on the actual RE efficiency and an estimated SINR (step 440). According to some embodiments, the searchable repository is a 2-dimension table using the actual RE efficiency to find the closest table entry whose corresponding column indicates the actual BLER. According to some embodiments, the method may further comprise calculating an actual outer-loop adjustment (OLA) step based on the actual BLER (step 450). According to some embodiments, the method may further comprise a dynamic outer-loop up/down step adjustment based on the actual OLA step.

According to some embodiments, the searchable repository is a 2-dimension RE efficiency vs SINR and BLER table, supporting a given BLER range (for example 0.1%-40%), that may be suitable for different scenarios (for example from GBR, Guaranteed Bit Rate, to non-GBR, non-Guaranteed Bit Rate.

According to some embodiments, the real RE efficiency actual BLER is calculated using the actual RE efficiency to find closest table entry whose corresponding column indicates the actual BLER. In another embodiment, the actual BLER is calculated using the actual RE efficiency to look up the repository to find closest entry to the actual BLER.

Figure 9:
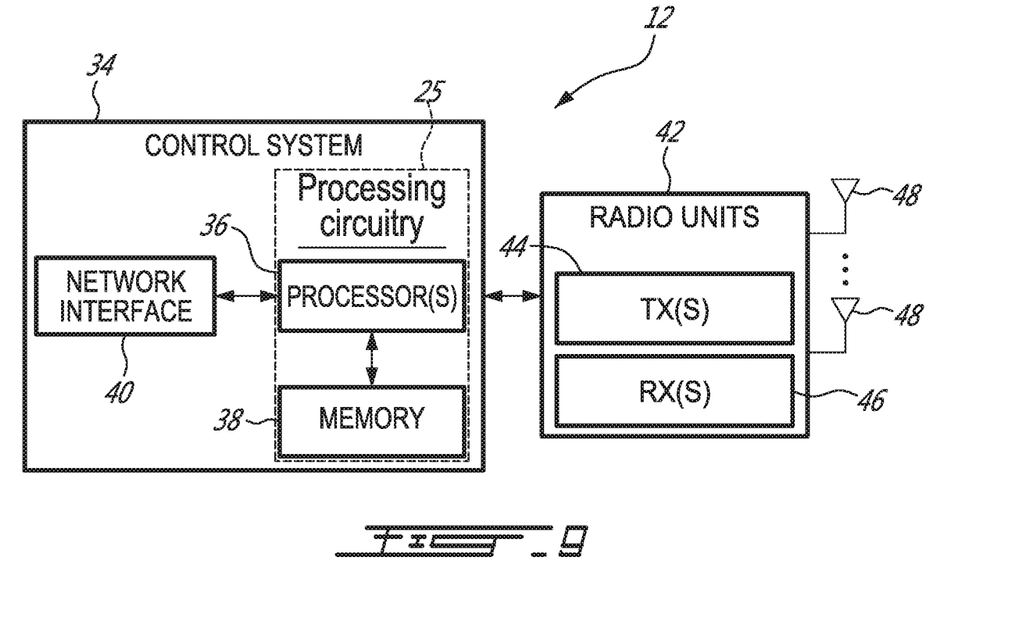
FIG. 9 through 11 illustrates example embodiments of a radio network node according to some embodiments of the present disclosure.
Figure 10:
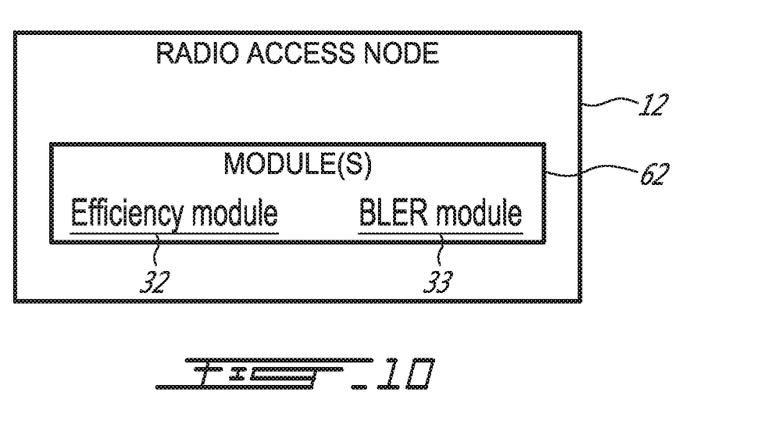
Figure 11:
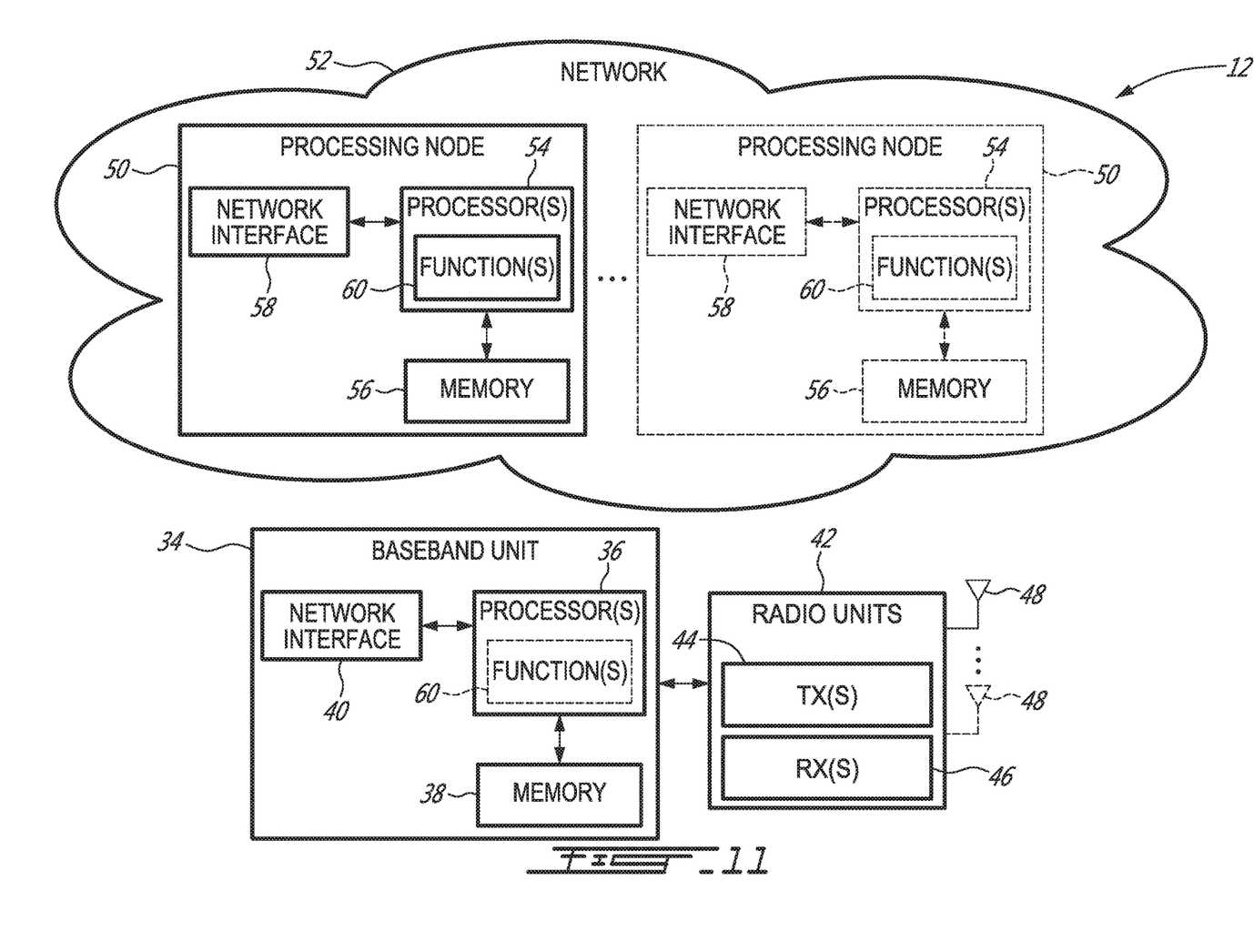

FIGS. 9 through 11 illustrate example embodiments of a radio network node (12) according to some embodiments of the present disclosure. FIG. 9 is a schematic block diagram of the node 12 according to some embodiments of the present disclosure. Other types of network nodes may have similar architectures (particularly with respect to including processor(s), memory, and a network interface). As illustrated, the radio access node 12 includes a control system 34 that includes processing circuitry 25. The processing circuitry may comprise one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 10 is a schematic block diagram of the radio access node 12 according to some other embodiments of the present disclosure. The radio access node 12 includes one or more modules 62, each of which is implemented in software. The module(s) 62 provide the functionality of the radio access node 12 described herein. The modules 62 include an efficiency module 32 and a BER module 33. The efficiency module 32 is operable to calculate an actual RE efficiency based at least in part on an actual TBS obtained from a specification. The TBS may be obtained from a specification based on LA result and actual buffer data volume. The BLER module 33 is operable to determine a real BLER from a searchable repository, based on the actual RE efficiency and an estimated SINR.

FIG. 11 is a schematic block diagram that illustrates a virtualized embodiment of the radio access node 12 according to some embodiments of the present disclosure. Other types of network nodes may have similar architectures (particularly with respect to including processor(s), memory, and a network interface). As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 9. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
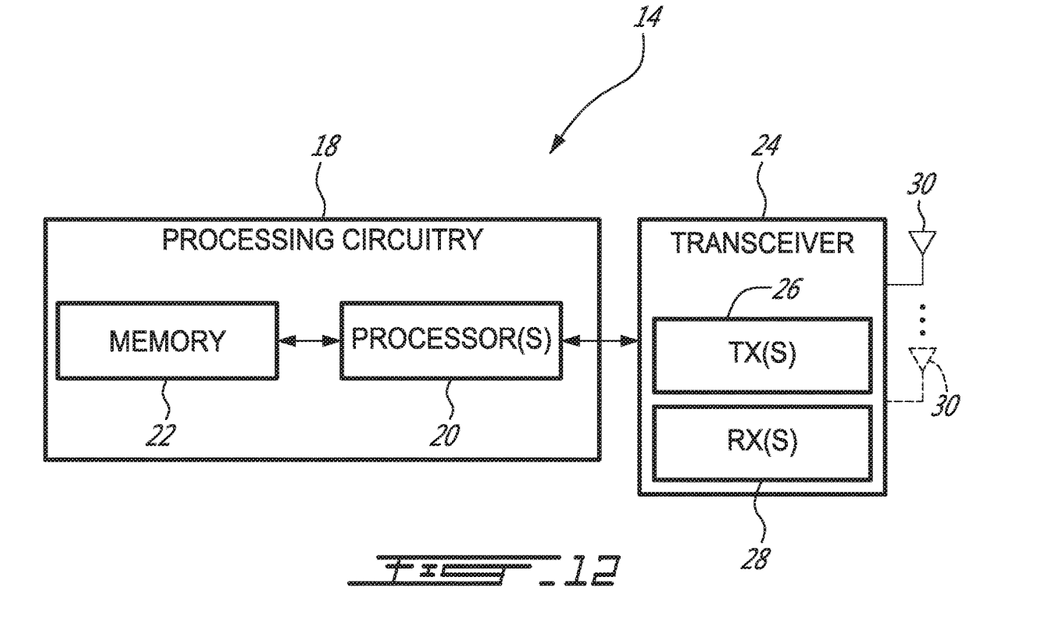
FIGS. 12 and 13 illustrate example embodiments of a wireless device according to some embodiments of the present disclosure.
Figure 13:
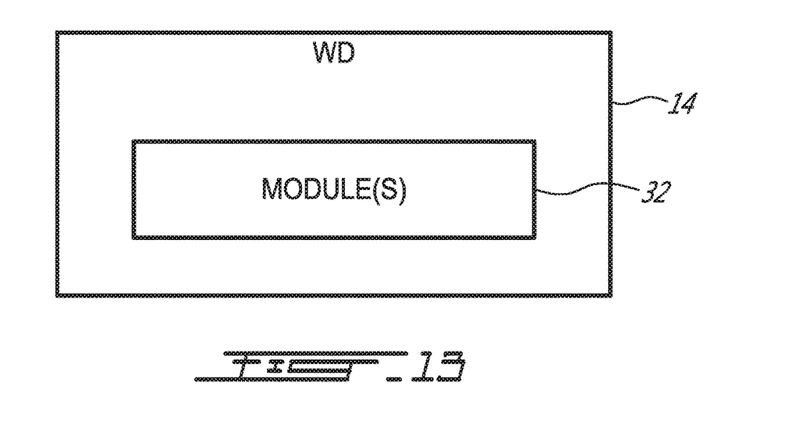

FIGS. 12 and 13 illustrate example embodiments of a second node 14 such as a wireless device 14 according to some embodiments of the present disclosure. FIG. 12 is a schematic block diagram of the wireless device 14 (e.g., a UE 14) according to some embodiments of the present disclosure. As illustrated, the wireless device 14 includes processing circuitry 18. The processing circuitry may comprise one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 15 is a schematic block diagram of the wireless device 14 according to some other embodiments of the present disclosure. The wireless device 14 includes one or more modules 72, each of which is implemented in software. The module(s) 72 provide the functionality of the wireless device 14 (e.g., UE 14) described herein.

Some of the following acronyms are used throughout this disclosure.

1D One-Dimension
    2D Two-Dimension
    3GPP Third Generation Partnership Project
    5G Fifth Generation
    ACK Acknowledgement
    ARQ Automatic Repeat-Request
    ASIC Application Specific Integrated Circuit
    BPSK Binary Phase-Shift Keying
    CE Control Element
    CPU Central Processing Unit
    CQI Channel Quality Indicator
    CRI CSI-RS Resource Indication
    CSI Channel State Information
    DCI Downlink Control Information
    DFT Discrete Fourier Transform
    DL-SCH Downlink Shared Channel
    eNodeB Enhanced or Evolved nodeB
    EPDCCH Enhanced PDCCH
    FDD Frequency Division Duplex
    FD-MIMO Full Dimension MIMO
    FPGA Field Programmable Gate Array
    GBR Guaranteed Bit-Error Rate
    GSM Global System for Mobile Communications
    HARQ Hybrid Automatic Repeat Request
    LTE Long Term Evolution
    MAC Medium Access Control
    MCS Modulation And Coding State
    MIMO Multiple-Input Multiple-Output
    ms millisecond
    MU-MIMO Multi-User MIMO
    NACK Negative Acknowledgement
    NR New Radio NZP Non-Zero Power
OFDM Orthogonal Frequency-Division Multiplexing
PDCCH Physical Downlink Control Channel
PMI Precoder Matrix Indicator
PRB Physical Resource Block
PUCCH Physical Uplink Control Channel
PUSCH Physical Uplink Shared Channel
QPSK Quadrature Phase-Shift Keying
RE Resource Element
RI Rank Indicator
RRC Radio Resource Control
RSRP Reference Signal Received Power
RSRQ Reference Signal Received Quality
RSSI Received Signal Strength Indicator
SINR Signal-to-Interference-and-Noise Ratio
SR Scheduling Request
SRB Signaling Radio Bearers
TDD Time-Division Duplex
TFRE Time/Frequency Resource Element
TS Technical Specification
UCI Uplink Control Information
UE User Equipment
ULA Uniform Linear Array
UL-SCH Uplink Shared Channel
UMB Ultra Mobile Broadband
UPA Uniform Planar Array
WCDMA Wideband Code-Division Multiple Access
WiMax Worldwide Interoperability for Microwave Access Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of operation of a network node in a wireless communication network, the method comprising:
determining an actual transport block size (TBS) based at least in part on an estimated signal to interference and noise ratio (SINR) and an actual buffer data volume;
calculating an actual resource element (RE) efficiency based at least in part on the actual TBS;
determining an actual block error rate (BLER) from a searchable repository, based on the actual RE efficiency and the estimated SINR, the searchable repository storing RE efficiency and SINR data for a predetermined range of BLER values; and
performing link adaptation (LA) based at least in part on the actual BLER;
wherein the estimated SINR is calculated using the following formula:

$$SINR_{estimated} = f(CQI) + OL\_adj,$$

wherein the f(CQI) is a mapping from a channel quality indicator (CQI) report to a specific SINR value and the OL_adj is an outer-loop adjustment, which is used to compensate a difference between reported CQI and actual channel quality.

2. The method of claim 1, wherein performing link adaptation (LA) comprises calculating an actual outer-loop adjustment (OLA) step based on the actual BLER.

3. The method of claim 2, further comprising a dynamic outer-loop up/down step adjustment based on the actual OLA step.

4. The method of claim 1 wherein the searchable repository is a 2-dimension RE efficiency vs SINR and BLER table, supporting a given BLER range.

5. The method of claim 4 wherein the actual BLER is calculated using the actual RE efficiency to find closest table entry whose corresponding column indicates the actual BLER.

6. The method of claim 1 wherein the wireless communication network is a LongTerm Evolution, LTE, wireless communication network.

7. The method of claim 1 wherein the wireless communication network is a New Radio, NR, or Fifth Generation, 5G, wireless communication network.

8. A network node within a wireless communication system, the network node comprising processing circuitry configured to:
determining an actual transport block size (TBS) based at least in part on an estimated signal to interference and noise ration (SINR) and an actual buffer data volume;
calculate an actual resource element (RE) efficiency based at least in part on the actual TBS;
determine an actual block error rate (BLER) from a searchable repository, based on the actual RE efficiency and the estimated SINR the searchable repository storing RE efficiency and SINR data for a predetermined range of BLER values; and
perform link adaptation (LA) based at least in part on the actual BLER
wherein the estimated SINR is calculated using the following formula:

$$SINR_{estimated} = f(CQI) + OL\_adj,$$

wherein the f(CQI) is a mapping from a channel quality indicator, CQI, report to a specific SINR value and the OL_adj is an outer-loop adjustment, which is used to compensate a difference between reported CQI and actual channel quality.

9. The network node of claim 8, wherein the processing circuitry is further configured to perform the link adaptation (LA) by calculating an actual outer-loop adjustment (OLA) step based on the actual BLER.

10. The network node of claim 9, wherein the processing circuitry (25) is further configured to perform a dynamic outer-loop up/down step adjustment based on the actual OLA step.

11. The network node of claim 8 wherein the searchable repository is a 2-dimension RE efficiency vs SINR and BLER table, supporting a given BLER range.

12. The network node of claim 11 wherein the actual BLER is calculated using the actual RE efficiency to find closest table entry whose corresponding column indicates the actual BLER.

* * * * *